United States Patent
Roh et al.

(10) Patent No.: US 8,422,393 B2
(45) Date of Patent: *Apr. 16, 2013

(54) METHOD FOR TRANSMITTING CHANNEL QUALITY INFORMATION BASED ON DIFFERENTIAL SCHEME

(75) Inventors: Dong Wook Roh, Anyang-si (KR); Bong Hoe Kim, Anyang-si (KR); Joon Kui Ahn, Anyang-si (KR); Yu Jin Noh, Anyang-si (KR); Dong Youn Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 91 days.

This patent is subject to a terminal disclaimer.

(21) Appl. No.: 13/217,153

(22) Filed: Aug. 24, 2011

(65) Prior Publication Data

US 2012/0051248 A1 Mar. 1, 2012

Related U.S. Application Data

(63) Continuation of application No. 12/448,908, filed as application No. PCT/KR2008/000674 on Feb. 4, 2008, now Pat. No. 8,036, 131.

(60) Provisional application No. 60/888,298, filed on Feb. 5, 2007, provisional application No. 60/894,870, filed on Mar. 14, 2007, provisional application No. 61/018,663, filed on Jan. 2, 2008.

(30) Foreign Application Priority Data

Sep. 11, 2007 (KR) .................. 10-2007-0092013
Jan. 29, 2008 (KR) .................. 10-2008-0009041

(51) Int. Cl.
*H04W 24/00* (2009.01)

(52) U.S. Cl.
USPC ........... 370/252; 370/241; 370/328; 370/329; 455/67.11; 455/67.7; 455/62

(58) Field of Classification Search .................. 370/252, 370/241, 328, 329, 343; 455/67.11, 67.7, 455/62, 69
See application file for complete search history.

(56) References Cited

U.S. PATENT DOCUMENTS

| | | | |
|---|---|---|---|
| 7,457,588 B2 * | 11/2008 | Love et al. ................. | 455/67.11 |
| 7,526,292 B2 | 4/2009 | Kim et al. | |
| 7,920,511 B2 * | 4/2011 | Khan et al. ................. | 370/328 |
| 8,014,455 B2 * | 9/2011 | Kim et al. ................. | 375/260 |
| 2002/0146074 A1 | 10/2002 | Ariel et al. | |
| 2005/0201295 A1 * | 9/2005 | Kim et al. ................. | 370/241 |
| 2005/0281226 A1 | 12/2005 | Lee et al. | |
| 2006/0233127 A1 * | 10/2006 | Derryberry et al. ......... | 370/328 |
| 2007/0026808 A1 | 2/2007 | Love et al. | |
| 2007/0168326 A1 | 7/2007 | Das et al. | |
| 2007/0195738 A1 | 8/2007 | Kim | |
| 2007/0242770 A1 | 10/2007 | Kim et al. | |
| 2007/0274253 A1 | 11/2007 | Zhang et al. | |
| 2008/0101407 A1 | 5/2008 | Khan et al. | |
| 2008/0159323 A1 | 7/2008 | Rinne et al. | |
| 2008/0165875 A1 | 7/2008 | Mundarath et al. | |
| 2008/0207135 A1 * | 8/2008 | Varadarajan et al. ......... | 455/69 |
| 2009/0060010 A1 | 3/2009 | Maheshwari et al. | |
| 2009/0109910 A1 | 4/2009 | Kim et al. | |

FOREIGN PATENT DOCUMENTS

| | | |
|---|---|---|
| EP | 1 575 234 A2 | 9/2005 |
| JP | 2005-223913 A | 8/2005 |
| KR | 10-2005-0119590 A | 12/2005 |
| WO | WO 02/067429 | 8/2002 |
| WO | WO 03/001702 | 1/2003 |
| WO | WO 2005/088870 A1 | 9/2005 |

OTHER PUBLICATIONS

Panasonic, "Evaluation and Error Statistics for CQI Reporting Schemes", Agenda Item: 6.12.2, Document for: Discussion, Decision, 3GPP TSG-RAN WG1 Meeting #46bis, Oct. 9-13, 2006 in Seoul, Korea, R1-062808.

Girod et al., "Feedback-Based Error Control for Mobile Video Transmission", Proceedings of the IEEE, vol. 87, No. 10, Oct. 1999, pp. 1707-1723.

Ajib et al., "Acknowledgment operations in the RLC layer of GPRS", IEEE International Workshop on Mobile Multimedia Communications, Nov. 1999, pp. 311-317.

Stockhammer et al., "Feedback and Error Protection Strategies for Wireless Progressive Video Transmission", IEEE Transactions on Circuits and Systems for Video Technology, vol. 12, No. 6, Jun. 2002, pp. 465-482.

Hofbauer et al., "ARQ Concept for the UMTS Long-Term Evolution", IEEE 64th Vehicular Technology Conference, Sep. 2006.

* cited by examiner

*Primary Examiner* — Ricky Ngo
*Assistant Examiner* — Rasheed Gigado
(74) *Attorney, Agent, or Firm* — McKenna Long & Aldridge LLP

(57) ABSTRACT

A method for transmitting channel quality information based on a differential scheme is disclosed. When channel quality information of a predetermined number of sub-bands selected by a receiver in a frequency selective channel is transmitted, total average channel information is transmitted. Channel information of the selected sub-bands is transmitted as sub-band differential information associated with average channel information. In this case, the sub-band differential information may be denoted by a specific value contained in a differential-value range including only positive (+) values. If at least two channel quality information is transmitted by a MIMO system, channel quality information of one channel is transmitted, then channel quality information of the other channel is transmitted as spatial differential information. In this case, the spatial differential information is denoted by a specific value contained in a differential-value range asymmetrical on the basis of "0".

12 Claims, 8 Drawing Sheets

METHOD FOR TRANSMITTING CHANNEL QUALITY INFORMATION BASED ON DIFFERENTIAL SCHEME

This application is a continuation of and claims the benefit of, U.S. application Ser. No. 12/448,908, filed Jul. 15, 2009, now U.S. Pat. No. 8,036,131, which is a National Stage Entry of International Patent Application No. PCT/KR2008/000674, filed on Feb. 4, 2008, and claims the benefit of Korean Patent Application No. 10-2007-0092013, filed Sep. 11, 2007, Korean Patent Application No. 10-2008-0009041, filed on Jan. 29, 2008, U.S. Provisional Patent Application No. 60/888,298, filed Feb. 5, 2007, U.S. Provisional Patent Application No. 60/894,870, filed Mar. 14, 2007, and U.S. Provisional Patent Application No. 61/018,663, filed Jan. 2, 2008, and is related to U.S. patent application Ser. No. 12/588,499, filed Oct. 16, 2009, the contents of each of the above mentioned applications are hereby incorporated by reference herein for all purposes as if set forth in their entireties.

TECHNICAL FIELD

The present invention relates to a method for transmitting channel quality information using a mobile communication system, and more particularly to a method for effectively reducing/transmitting the amount of feedback for channel quality information on the basis of a differential scheme in a frequency selective channel, and a method for effectively transmitting channel quality information on the basis of a differential scheme in a Multiple Input Multiple Output (MIMO) system.

BACKGROUND ART

A channel quality indicator (CQI) for indicating channel quality information to be described later in the present invention will hereinafter be described.

In order to implement an effective communication system, a receiver needs to inform a transmitter of feedback channel information. Generally, the receiver transmits downlink channel information through an uplink, and transmits uplink channel information through a downlink. This above-mentioned channel information is called a channel quality indicator (CQI).

The above-mentioned CQI can be generated in various ways. For example, channel state information is quantized without any change, so that the CQI can be transmitted using the quantized channel state information. A Signal to Interference and Noise Ratio (SINR) is calculated, and the CQI is transmitted according to the calculated SINR. And, the CQI may inform actual application status information of a channel in the same manner as in a Modulation Coding Scheme (MCS).

There are many cases for generating the CQI on the basis of the MCS in the above-mentioned CQI generation methods, so that their detailed description will hereinafter be described.

For example, the CQI can be generated for an HSDPA transmission scheme based on the 3rd Generation Partnership Project (3GPP). In this way, if the CQI is generated on the basis of the MCS, the MCS includes a modulation scheme, a coding scheme, and an associated coding rate, etc. Therefore, if the modulation scheme and the coding scheme are changed, the CQI must also be changed, so that a minimum number of CQI required for a codeword unit is at least 1.

If the MIMO scheme is applied to a system, the number of required CQIs is changed. In other words, the MIMO system generates multiple channels (i.e., a multi-channel) using multiple antennas (i.e., a multi-antenna), so that a plurality of codewords can be used for the MIMO system. As a result, the MIMO system must also use a plurality of CQIs. In this way, if many CQIs are used for the MIMO system, an amount of control information required for the CQIs proportionally increases.

FIG. 1 is a conceptual diagram illustrating a method for generating/transmitting the CQI.

Referring to FIG. 1, the user equipment (UE) 100 measures a downlink channel quality, selects a CQI value representing a CQI index on the basis of the measured downlink channel quality, and reports the selected CQI value over an uplink control channel to the Node-B 200. The Node-B 200 performs downlink scheduling (e.g., UE selection, resource allocation, etc.) according to the reported CQI value.

In this case, the CQI value may represent a CQI index based on a Signal to Interference and Noise Ratio (SINK), a Carrier to Interference and Noise Ratio (CINR), a Bit Error Rate (BER), a Frame Error Rate (FER), or associated calculation value configured in the form of transmittable data. In the case of the MIMO system, Rank Information (RI) or Precoding Matrix Information (PMI) may be added to channel state information.

In the meantime, a mobile communication system employs a link adaptation to maximally use a channel capacity, and adjusts a Modulation and Coding Set (MCS) and a Transmission Power (TP) according to a given channel. In order to perform the above-mentioned link adaptation at the Node-B, the user equipment (UE) must feed back channel quality information to the Node-B.

If a frequency band used by the system has a bandwidth wider than a coherent bandwidth, a channel status is abruptly changed within an entire bandwidth.

Specifically, a multi-carrier system such as an Orthogonal Frequency Division Multiplexing (OFDM) system has a plurality of sub-carriers within a given bandwidth. The multi-carrier system transmits a modulated symbol via each sub-carrier, so that its optimum transmission is that the each subcarrier channel is considered when transmitting data.

Therefore, an amount of feedback channel information abruptly increases in the multi-carrier system including several sub-carriers, so that the demand of developing an improved method for reducing overhead of control signals is rapidly increased.

DISCLOSURE

Technical Problem

Accordingly, the present invention is directed to a method for transmitting channel quality information on the basis of a differential scheme that substantially obviates one or more problems due to limitations and disadvantages of the related art.

An object of the present invention is to provide a method for reducing overhead generated when channel quality information is transmitted over a frequency selective channel.

Another object of the present invention is to provide a differential CQI reporting scheme to indicate a differential CQI using less amount of control information, a method for defining the range of a differential value indicating the differential CQI to represent more correct channel state information, and a quantization method for indicating the differential CQI.

Another object of the present invention is to provide a method for reducing overhead over the frequency selective channel, and/or a method for reducing overhead generated when channel quality information is transmitted via a MIMO system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to transmit a channel quality indicator (CQI) to a base station is provided. The method comprises: selecting a preferred set of M subbands among a set of N subbands, wherein the set of N subbands spans an entire downlink system bandwidth; reporting the positions of the M selected subbands using a combinatorial index selected from among $\{0, 1, \ldots, NCM-1\}$; reporting one CQI value representing wideband CQI index for the set of N subbands; and reporting one differential CQI value reflecting the transmission of the base station only over the M selected subbands among a predetermined number of differential CQI values, wherein each of the differential CQI values is defined based on an offset level corresponding to:

a CQI index for the M selected subbands—the wideband CQI index, and wherein the differential CQI values represent more of a first case in which the offset level has a positive value than a second case in which the offset level has a negative value.

Preferably, when the UE selects the preferred set of M subbands, the UE reports the positions of subbands using the combinatorial index representing the M selected subbands.

Preferably, each of the subbands comprises X frequency domain units, the entire downlink system bandwidth comprises Y frequency domain units, and the number of subbands spanning the entire downlink system bandwidth (N) corresponds to an integer number not less than Y/X.

Preferably, each of the subbands comprises a plurality of subcarriers.

Preferably, the differential CQI value is represented as a 2-bit value.

Preferably, the positions of the M selected subbands, the CQI value representing wideband CQI index and the differential CQI value are reported via a Physical Uplink Shared Channel (PUSCH).

To achieve the above objects and other advantages and in accordance with the purpose of the invention, as embodied and broadly described herein, a user equipment (UE) for transmitting a channel quality indicator (CQI) to a base station is provided. The UE comprises: a receiver configured to receive signals from the base station; a processor configured to select a preferred set of M subbands among a set of N subbands, wherein the set of N subbands spans an entire downlink system bandwidth; and a transmitter configured to report the positions of the M selected subbands using a combinatorial index selected from among $\{0, 1, \ldots NCM-1\}$, one CQI value representing wideband CQI index for the set of N subbands, and one differential CQI value reflecting the transmission of the base station only over the M selected subbands among a predetermined number of differential CQI values, wherein each of the differential CQI values is defined based on an offset level corresponding to:

a CQI index for the M selected subbands—the wideband CQI index, and wherein the differential CQI values represent more of a first case in which the offset level has a positive value than a second case in which the offset level has a negative value.

Preferably, when the processor selects the preferred set of M subbands, the transmitter reports the positions of subbands using the combinatorial index representing the M selected subbands.

Preferably, each of the subbands comprises X frequency domain units, the entire downlink system bandwidth comprises Y frequency domain units, and wherein the number of subbands spanning the entire downlink system bandwidth (N) corresponds to an integer number not less than Y/X.

Preferably, each of the subbands comprises a plurality of subcarriers.

Preferably, the differential CQI value is represented as a 2-bit value.

Preferably, the positions of the M selected subbands, the CQI value representing wideband CQI index and the differential CQI value are reported via a Physical Uplink Shared Channel (PUSCH).

It is to be understood that both the foregoing general description and the following detailed description of the present invention are exemplary and explanatory and are intended to provide further explanation of the invention as claimed.

Advantageous Effects

According to the above-mentioned embodiments of the present invention, if the CQI is represented by the differential CQI scheme over the frequency selective channel, and a reference value based on the differential scheme is a CQI average value of all corresponding bands, a differential value for indicating the differential CQI is effectively established, so that correct channel quality information can be transmitted with less number of bits.

In more detail, the frequency selective channel transmits the CQI according to a sub-band differential CQI scheme, so that the CQI associated with a plurality of sub-bands can be effectively transmitted. The MIMO system transmits the CQI associated with the plurality of sub-bands according to the spatial differential CQI scheme, so that it can additionally reduce an amount of overhead.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
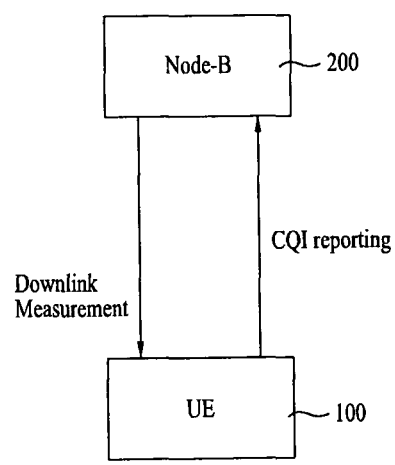
FIG. 1 is a conceptual diagram illustrating a CQI generation and transmission scheme.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention. For example, the following description will disclose detailed examples of the above-mentioned 3GPP LTE (3rd Generation Partnership Project Long Term Evolution) system, the scope or spirit of the present invention is not limited to only the 3GPP LTE system, and can also be applied to other communication systems which may require a feedback of downlink channel quality information.

For the convenience of description and better understanding of the present invention, the following detailed description will disclose a variety of embodiments and modifications of the present invention. In some cases, in order to prevent ambiguous concepts of the present invention from occurring, conventional devices or apparatuses well known to those skilled in the art will be omitted and denoted in the form of a block diagram on the basis of the important functions of the present invention.

Firstly, the present invention may change a transmission unit of channel information to another unit. For example, according to the OFDM scheme, the present invention may combine transmission (Tx) channel information for several sub-carriers into a single sub-carrier group, and transmits the combined channel information in units of the corresponding group. In other words, if the OFDM scheme based on 2048 sub-carriers collects 12 sub-carriers to form a single sub-carrier group, a total of 171 sub-carrier groups are formed, so that the number of actual Tx channel information units is reduced from 2048 to 171.

According to the following description, if individual frequency bands are distinguished by individual sub-carriers, respectively, in the same manner as in the OFDM scheme, the present invention combines one or more sub-carriers into a single group, and reports a CQI for each sub-carrier group unit as a basic unit. In this case, the basic unit is called a CQI sub-carrier group or CQI sub-band.

In the meantime, if the individual frequency bands are not distinguished from each other as in the individual sub-carriers, an overall frequency band is divided into several frequency bands, and the CQI is generated on the basis of the divided frequency bands. Each divided frequency band for the CQI generation is called a CQI sub-band. This CQI sub-band will hereinafter be referred to as a "sub-band".

Next, the present invention may generate the CQI by compressing channel information. For example, the OFDM system compresses channel information for each sub-carrier using a specific compression scheme, and transmits the compressed channel information. For example, the present invention may consider a variety of compression methods such as a Discrete Cosine Transform (DCT).

Also, the present invention may select a corresponding frequency band for generating channel information, and may generate the CQI using the selected frequency band. The OFDM system may selectively transmit best M sub-carriers or best M sub-carrier groups, instead of transmitting channel information to each of all sub-carriers. For example, a Best-M scheme may be used as a selective transmission scheme.

When the CQI is transmitted over the selected frequency band, an actual transmission part can be generally divided into two parts, i.e., a CQI-value part and a CQI subband-index part.

Figure 2:
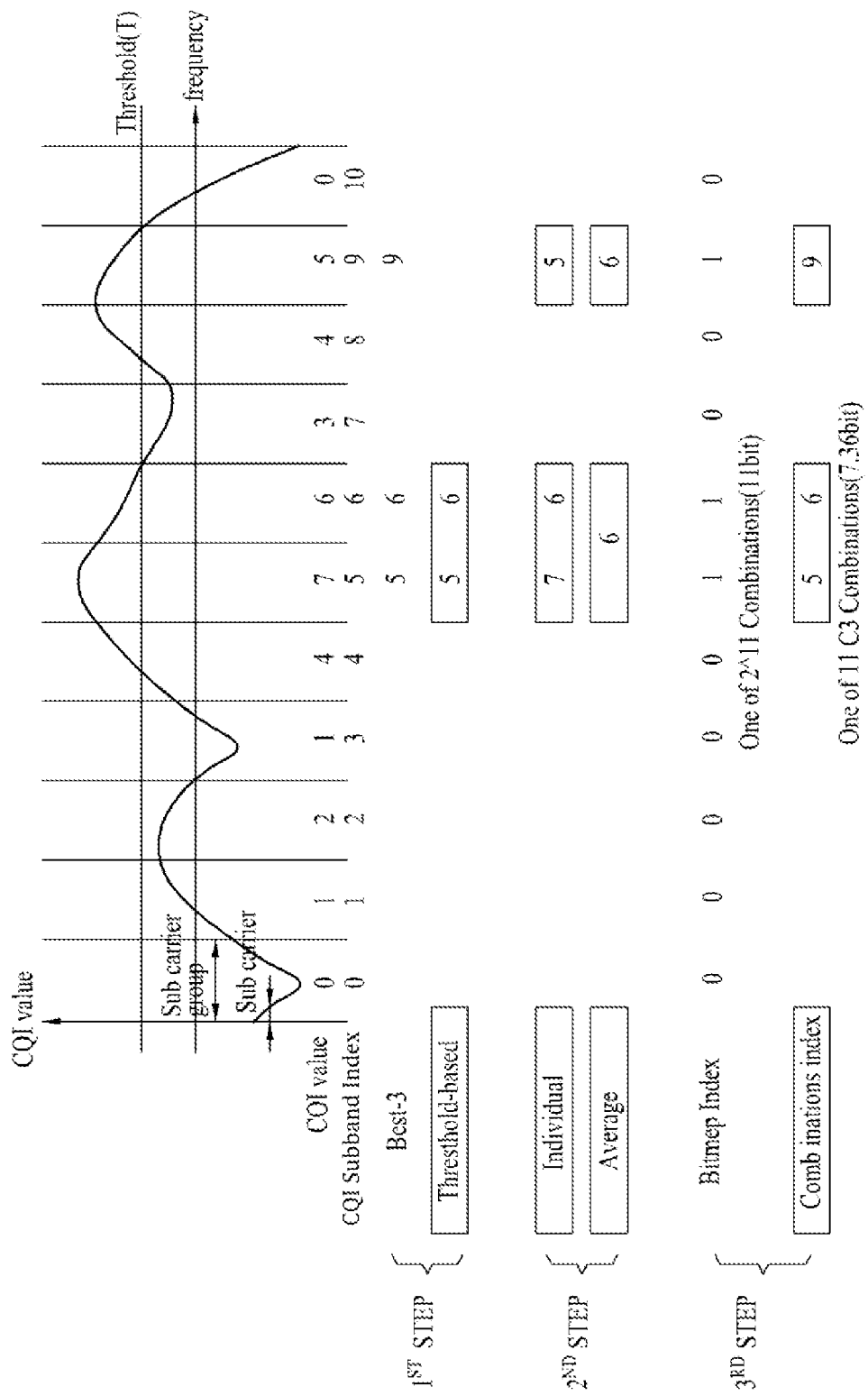
FIG. 2 is a conceptual diagram illustrating a method for generating a CQI by selectively establishing a CQI sub-band in a frequency domain.

FIG. 2 is a conceptual diagram illustrating a method for generating a CQI by selectively establishing a CQI sub-band in a frequency domain.

In a graph shown in an upper part of FIG. 2, a horizontal axis is a frequency axis, and a vertical axis is a CQI value of each frequency domain. In the graph shown in the upper part of FIG. 2, the horizontal axis is divided into grouping sub-band units of several sub-carriers, and indexes are assigned to individual sub-bands, respectively.

A frequency-domain selective CQI method (i.e., a frequency selective CQI method) generally includes the following three steps. In the first step, the frequency selective CQI method selects a CQI sub-band in which the CQI will be generated. In the second step, the frequency selective CQI method manipulates CQI values of the selected frequency bands, and generates/transmits the CQI values. In the third step, the frequency selective CQI method transmits indexes of the selected frequency bands (i.e., CQI sub-bands).

FIG. 2 shows the Best-M scheme and the Threshold-based scheme as examples of the method for selecting the CQI sub-band in the above-mentioned first step.

The Best-M scheme is adapted to select M CQI sub-bands having a good channel status. FIG. 2 shows an exemplary method for selecting CQI sub-bands of Nos. 5, 6, and 9 indexes having a good channel status using the Best-3 scheme. The threshold-based scheme selects the CQI sub-band having a channel status value higher than a predetermined threshold value (T). As can be seen from FIG. 2, the threshold-based scheme selects the Nos. 5 and 6 CQI sub-bands having a channel status value higher than the threshold value (T).

In the meantime, FIG. 2 shows exemplary methods for generating/transmitting CQI values in the second step, i.e., an individual transmission scheme and an average transmission scheme.

The individual transmission scheme transmits all CQI values of the selected CQI sub-bands of the above-mentioned first step. Therefore, according to the individual transmission scheme, the higher the number of selected CQI sub-bands, the higher the number of CQIs to be transmitted.

In the meantime, the average transmission scheme transmits an average value of CQI values of the selected CQI sub-bands. Therefore, the average transmission scheme has a single CQI value to be transmitted, irrespective of the number of selected CQI sub-bands. If an average value of several CQI sub-bands is transmitted, accuracy is deteriorated. In this case, the average value of the CQI values may be calculated by an arithmetic average scheme or a channel capacity average scheme.

As shown in FIG. 2, the CQI generation/transmission method in the second step is associated with the first step in which Nos. 5, 6, and 9 CQI sub-bands are selected by the Best-3 scheme. In other words, if the individual transmission scheme is used in the second step, CQI values 7, 6, and 5 of Nos. 5, 6, and 9 sub-bands are generated and transmitted respectively. If the average transmission scheme is used in the second step, CQI values of Nos. 5, 6, and 9 sub-bands arithmetically average to "6".

FIG. 2 shows exemplary methods for transmitting the index of the CQI sub-band in the third step, for example, a bitmap index scheme and a general combinatorial index scheme.

The bitmap index scheme assigns a single bit to each of all CQI sub-bands. If a corresponding CQI sub-band is used, "1" is assigned to the corresponding CQI sub-band. Otherwise, if a corresponding CQI sub-band is not used, "0" is assigned to the corresponding CQI sub-band. The bitmap index scheme indicates which one of CQI sub-bands will be used. The bitmap index scheme requires several bits as many as total CQI sub-bands. However, the bitmap index scheme may indicate which one of CQI sub-bands will be used using a fixed number of bits without considering how many CQI sub-bands will be used.

In the meantime, the combinatorial index scheme determines how many CQI sub-bands will be used, maps individual cases of combinations corresponding to the number of used CQI sub-bands from among a total of CQI sub-bands to individual indexes, and indicates the mapping result. In more detail, if a total of N CQI sub-bands exist, and M CQI sub-band indexes from among N CQI sub-band indexes are used to generate the CQI, a total number of available combinations can be represented by the following equation 1:

$$_N C_M = \frac{N!}{M!(N-M)!} \quad \text{[Equation 1]}$$

The number of bits indicating the number of cases shown in Equation 1 can be represented by the following equation 2:

$$\lceil \log_2(_N C_M) \rceil = \left\lceil \log_2\left(\frac{N!}{M!(N-M)!}\right) \right\rceil \quad \text{[Equation 2]}$$

FIG. 2 shows the method for selecting three CQI sub-bands from among a total of 11 CQI sub-bands. In FIG. 2, the number of available cases is $_{11}C_3 = 165$. The number of bits to indicate the above-mentioned 165 cases is 8 (i.e., 8 bits), as denoted by $2^7 \leq\ _{11}C_3 \leq 2^8$.

The CQI transmission method based on the differential scheme is classified into a first CQI transmission method according to a first embodiment and a second CQI transmission method according to a second embodiment. The first CQI transmission method applies the above-mentioned CQI transmission method to transmit a CQI of each sub-band over the frequency selective channel. The second CQI transmission method applies the above-mentioned CQI transmission method to spatially transmit a CQI of at least two channels by the MIMO system.

First Embodiment

Sub-Band Differential CQI Transmission Method

According to the following first embodiment, the present invention generates/transmits the CQI using the Best-M scheme from among the above-mentioned CQI generation/transmission schemes, converts a CQI value to be transmitted to M sub-bands into differential information associated with a total-band CQI value, and reduces an amount of overhead.

In the case of indicating CQI values of individual bands using the frequency-band selective CQI generation method, a differential scheme can be applied to indicate the above-mentioned CQI values. In more detail, an average value of CQI values of a total frequency band acting as a reference is calculated, and CQI values of a frequency band selected by a receiver can be represented on the basis of the calculated average value. In other words, an average value of the CQI values of each selected frequency band is calculated, and the average value is compared with a reference value, so that the resultant CQI values can be represented by a difference between the reference value and each average value.

If a correlation between the average value and each CQI value exists in the case of using the above-mentioned differential scheme, the present invention can effectively represent the CQI value with less number of differential values. The following first embodiment of the present invention will disclose a method for indicating differential information with less number of bits exploiting a correlation between a CQI value of a selected sub-band and an average CQI of all bands.

For the convenience of description, it is assumed that the first embodiment indicates the frequency selective CQI in the form of difference values based on a total average according to the differential scheme. In order to implement the frequency selective CQI method, the receiver is designed to basically select only CQI sub-bands having a relatively good channel status. Therefore, there is every probability that each CQI value of the selected CQI sub-bands is higher than a total average CQI value. Needless to say, strictly speaking, as the number of the selected CQI sub-bands is gradually less than a total number of CQI sub-bands, the probability that each CQI value of the selected CQI sub-bands is higher than a total average CQI value gradually increases. Generally, most frequency selective CQI methods select only a small number of good bands from among a total broad band, so that it can be considered that each of the CQI values of the selected CQI sub-bands be higher than the total average CQI value.

For example, a method for transmitting CQI values of the selected sub-bands 5, 6, and 9 of the Best-3 scheme shown in FIG. 2 will hereinafter be described in detail.

Referring to FIG. 2, an average CQI value of a total frequency band serving as a CQI transmission reference is 3, as denoted by "3=(0+1+2+1+4+7+6+3+4+5+0)/11". Therefore, the CQI values 7, 6, and 5 of the sub-bands 5, 6, and 9 selected by the receiver according to the Best-3 scheme are converted into differential values (i.e., 4, 3, and 2) associated with the value of reference value 3, respectively. It can be recognized that the converted differential values 4, 3, and 2 are all positive (+).

Therefore, provided that the frequency selective CQI scheme has used the total average CQI value as a reference value, it can consider a specific directivity (or orientation) when establishing the range of a difference value indicating differential information.

In more detail, CQI values of the CQI sub-bands selected by the receiver are generally higher than a reference value equal to a total average CQI value, so that a differential value may be generally equal to or higher than "0". Therefore, in the case of establishing the differential-value range for indicating the differential value, a method for considering only the remaining values other than negative (−) values may be considered to be effective. Therefore, the first embodiment of the present invention proposes a method for establishing the differential-value range using the above-mentioned description, configuring each CQI of the selected sub-bands of the receiver in the form of a specific value within such a differential value range, and transmitting the resultant CQI configured in the form of the specific value.

For example, if 3 bits are assigned for the differential scheme, 8 values can be established, so that the setup range of the differential value is set to [−3 −2 −1 0 1 2 3 4] in consideration of all positive (+) and negative (−) values. However, if only specific values higher than "0" are considered, the setup range of the differential value is set to [0 1 2 3 4 5 6 7], so that a wider area can be denoted by given bits.

Therefore, provided that the differential CQI scheme is used as the frequency selective CQI transmission scheme, and a reference value is used as a CQI average value of a total CQI reporting band, the first embodiment of the present invention provides a method for considering only the remaining areas other than negative (−) areas in the case of establishing a difference value indicating a differential CQI.

In the meantime, the above-mentioned method can be applied to not only the method for transmitting CQIs of the selected frequency bands, respectively, but also the method for transmitting an average value of the CQI values of the selected frequency bands. In other words, a difference value between a desired average value of the CQI values of the selected frequency bands and another average value of CQI values of all corresponding frequency bands is calculated, so that the desired average value may also be represented by the above-mentioned differential value.

For example, in addition to the above-mentioned Best-3 scheme (See FIG. 2) in which CQI values 7, 6, and 5 of the selected sub-bands 5, 6, and 9 selected by the receiver have been converted into differential values (i.e., 4, 3, and 2) associated with the reference value of 3 equal to the total average CQI value, the above-mentioned first embodiment may also transmit an average value "6" of the CQI values of the selected sub-bands 5, 6, and 9, or may also transmit a difference value "3" between the average value "6" of selected sub-bands and the CQI average value "3" of all bands.

According to the above-mentioned first embodiment, negative (−) values will not be used when a differential-value range for indicating the differential CQI is established, so that only the remaining values other than the negative values are used when the differential value range is established. However, as previously stated above, if a difference between a corresponding bandwidth and a selected bandwidth is very small, there is a low probability that the differential CQI value has a positive (+) value. Therefore, in order to more stably establish the range of a difference value, only positive (+) values are mainly considered, but some negative (−) values may also be considered as necessary. Namely, when the difference value range for the differential CQI is established, the range of positive and negative values does not have a symmetrical shape on the basis of "0", and has an asymmetrically skewed shape on the basis of "0". In more detail, in the case of the asymmetrical shape, the allocation range of positive (+) and negative (−) parts leans to the positive (+) part on the basis of "0", so that the asymmetrical range inclined to the positive part is formed. In this way, the first embodiment provides the above-mentioned method for forming the asymmetrical range inclined to the positive part on the basis of "0", so that it may effectively consider the formed asymmetrical range.

In the meantime, the above-mentioned method can also be applied to not only the individual transmission scheme for transmitting each CQI of the selected frequency band, but also the average transmission scheme for averaging CQI values of the selected frequency band. In other words, the above-mentioned method can also be applied to the method for representing an average value of CQI values of the selected frequency band using a difference value between the CQI values of the selected frequency band and an average value of CQI values of all corresponding frequency bands.

Second Embodiment

Spatial Differential CQI Transmission Method

According to the following second embodiment, the present invention simultaneously or independently configures CQIs of several channels in the form of a differential value on the basis of a specific CQI of any one of the channels, and transmits the differential-formatted CQIs, so that it reduces an amount of overhead. A detailed description of the second embodiment will hereinafter be described with reference to the MIMO system.

A Multi-Input Multi-Output (MIMO) technology will hereinafter be described in detail.

In brief, the MIMO technology is an abbreviation of the Multi-Input Multi-Output technology. The MIMO technology uses multiple transmission (Tx) antennas and multiple reception (Rx) antennas to improve the efficiency of Tx/Rx data, whereas a conventional art has generally used a single transmission (Tx) antenna and a single reception (Rx) antenna. In other words, the MIMO technology allows a transmitter or receiver of a wireless communication system to use multiple antennas (hereinafter referred to as a multi-antenna), so that the capacity or performance can be improved. For the convenience of description, the term "MIMO" can also be considered to be a multi-antenna technology.

In more detail, the MIMO technology is not dependent on a single antenna path to receive a single total message, collect a plurality of data pieces received via several antennas, and complete total data. As a result, the MIMO technology can increase a data transfer rate within a specific range, or can increase a system range at a specific data transfer rate. In other words, the MIMO technology is the next-generation mobile communication technology capable of being applied to mobile communication terminals or repeaters.

The next-generation mobile communication technology requires a data transfer rate higher than that of a conventional mobile communication technology, so that it is expected that the effective MIMO technology is requisite for the next-generation mobile communication technology. Under this situation, the MIMO communication technology is the next-generation mobile communication technology capable of being applied to mobile communication terminals or repeaters, and can extend the range of a data communication range, so that it can overcome the limited amount of transfer data of other mobile communication systems due to a variety of limited situations.

In the meantime, the MIMO technology, which uses multiple antennas at all transmitters/receivers, from among a variety of technologies capable of improving the transfer efficiency of data can greatly increase an amount of communication capacity and Tx/Rx performances without allocating additional frequencies or increasing additional power. Due to these technical advantages, most companies or developers are intensively paying attention to this MIMO technology.

Figure 3:
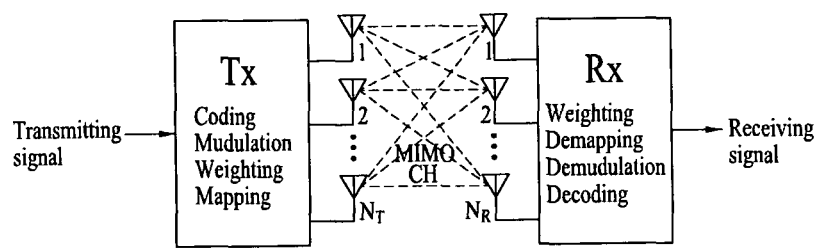
FIG. 3 is a conceptual diagram illustrating a general MIMO system.

FIG. 3 is a conceptual diagram illustrating a general MIMO system.

Referring to FIG. 3, if the number of transmission (Tx) antennas increases to a predetermined number, and at the same time the number of reception (Rx) antennas increases to a predetermined number, a theoretical channel transmission capacity of the MIMO system increases in proportion to the number of antennas, differently from the above-mentioned case in which only a transmitter or receiver uses several antennas, so that a frequency efficiency can greatly increase.

After the above-mentioned theoretical capacity increase of the MIMO system has been demonstrated in the mid-1990s, many developers are conducting intensive research into a variety of technologies which can substantially increase a data transfer rate using the theoretical capacity increase. Some of them have been reflected in a variety of wireless communication standards, for example, a third-generation mobile communication or a next-generation wireless LAN, etc.

A variety of MIMO-associated technologies have been intensively researched by many companies or developers, for example, research into an information theory associated with a MIMO communication capacity calculation under various channel environments or multiple access environments, research into a wireless channel measurement and modeling of the MIMO system, and research into a space-time signal processing technology.

The above-mentioned MIMO technology can be classified into a spatial diversity scheme and a spatial multiplexing scheme. The spatial diversity scheme increases transmission reliability using symbols passing on various channel paths. The spatial multiplexing scheme simultaneously transmits a plurality of data symbols via a plurality of Tx antennas, so that it increases a transfer rate of data. In addition, the hybrid scheme of the spatial diversity scheme and the spatial multiplexing scheme has also been recently developed to properly acquire unique advantages of the two schemes.

Detailed descriptions of the spatial diversity scheme, the spatial multiplexing scheme, and the hybrid scheme thereof will hereinafter be described in detail.

Firstly, the spatial diversity scheme will hereinafter be described. The spatial diversity scheme is classified into a space-time block code scheme and a space-time trellis code scheme which can simultaneously use a diversity gain and a coding gain. Generally, a bit error ratio (BER) improvement performance and a code-generation degree of freedom of the space-time trellis code scheme are superior to those of the space-time block code scheme, whereas the receiver complexity of the space-time block code scheme is superior to that of the space-time Trellis code scheme.

The above-mentioned spatial diversity gain corresponds to the product or multiplication of the number of Tx antennas and the number of Rx antennas.

In the meantime, if the space-time coding scheme is considered in a frequency domain instead of the time domain, it may also be considered to be the space-frequency coding scheme. As a result, the same scheme is applied to not only the frequency domain but also the time domain without any changes.

Secondly, the spatial multiplexing scheme will hereinafter be described. The spatial multiplexing scheme is adapted to transmit different data sequence via individual Tx antennas. In this case, a receiver may unavoidably generate mutual interference between data pieces simultaneously transmitted from transmitter antennas. The receiver removes this mutual interference from the received data using a proper signal processing technique, so that it can receive the resultant data having no interference. In order to remove noise or interference from the received data, a maximum likelihood receiver, a ZF receiver, a MMSE receiver, a D-BLAST, or a V-BLAST may be used. Specifically, if a transmitter can recognize channel information, a Singular Value Decomposition (SVD) scheme may be used to remove the noise or interference.

Thirdly, the hybrid scheme of the spatial diversity scheme and the spatial multiplexing scheme will hereinafter be described. Provided that only a spatial diversity gain is acquired, the performance-improvement gain is gradually saturated in proportion to an increasing diversity order. Otherwise, provided that only the spatial multiplexing gain is acquired, a transmission reliability of a wireless channel is gradually deteriorated.

As a result, a variety of schemes capable of acquiring all the above-mentioned two gains simultaneously while solving the above-mentioned problems have been intensively researched by many companies or developers, for example, a double-STTD scheme and a space-time BICM (STBICM) scheme.

A general communication system performs coding of transmission information of a transmitter using a forward error correction code, and transmits the coded information, so that an error experienced at a channel can be corrected by a receiver. The receiver demodulates a received (Rx) signal, and performs decoding of forward error correction code on the demodulated signal, so that it recovers the transmission information. By the decoding process, the Rx-signal error caused by the channel is corrected.

Each of all forward error correction codes has a maximum-correctable limitation in a channel error correction. In other words, if a reception (Rx) signal has an error exceeding the limitation of a corresponding forward error correction code, a receiver is unable to decode the Rx signal into information having no error. Therefore, the receiver must detect the presence or absence of an error after decoding the received information. In this way, a specialized coding process for performing error detection is required, separately from the forward error correction coding process. Generally, a Cyclic Redundancy Check (CRC) code has been used as an error detection code.

The CRC method is an exemplary coding method for performing the error detection. Generally, the transmission information is coded by the CRC method, and then the forward error correction code is applied to the CRC-coded information. A single unit coded by the CRC and the forward error correction code is generally called a codeword.

In the meantime, if several transmission information units are overlapped and then received, the present invention can expect performance improvement using an interference-cancellation receiver. There are many cases in the above-mentioned case in which some transmission information is overlapped and then received, for example, a case in which the MIMO technology is used, a case in which a multi-user detection technology is used, and a case in which a multi-code technology is used. A brief description of the interference-cancellation structure will be as follows.

According to the interference-cancellation structure, after first information is demodulated/decoded from a total reception signal in which some information is overlapped, information associated with the first information is removed from the total reception signal. A second signal is demodulated/decoded by the resultant signal without first information by removing from the reception signal. A third signal is demodulated/decoded by the resultant signal without first- and second-information by removing from the first reception signal.

A fourth signal or other signal after the fourth signal repeats the above-mentioned processes, so that the fourth or other signal is demodulated/decoded.

In order to use the above-mentioned interference cancellation method, the demodulated/decoded signal removed from the reception signal must have no errors. If any errors occur in the demodulated/decoded signal, error propagation occurs so that a negative influence continuously affects all the demodulated/decoded signals.

The above-mentioned interference cancellation technology can also be applied to the MIMO technology. In order to use the above-mentioned interference cancellation technology, several transmission information pieces must be overlapped/transmitted via multiple antennas. In other words, if the spatial multiplexing technology is used, each transmission information is detected, and at the same time the interference cancellation technology can be used.

However, as described above, in order to minimize the error propagation caused by the interference cancellation, it is preferable that the interference is selectively removed after determining the presence or absence of an error in the demodulated/decoded signal. A representative method for determining the presence or absence of the error in each transmission information is the above-mentioned cyclic redundancy check (CRC) method. A unit of distinctive information processed by the CRC coding is called a codeword. Therefore, a more representative method for using the interference cancellation technology is a specific case in which several transmission information pieces and several codewords are used.

In the meantime, the fading channel is a major cause of deterioration of a performance of a wireless communication system. A channel gain value is changed according to time, frequency, and space. The lower the channel gain value, the lower the performance. A representative method for solving the above-mentioned fading problem is diversity. This diversity uses the fact that there is a low probability that all independent channels have low gain values at the same time. A variety of diversity methods can be applied to the present invention, and the above-mentioned multi-user diversity is considered to be one of them.

If several users are present in a cell, channel gain values of individual users are statistically independent of each other, so that the probability that all the users have low gain values is very low. If a Node-B has sufficient transmission (Tx) power and several users are present in a cell, it is preferable that all channels be allocated to a specific user having the highest channel gain value to maximize a total channel capacity. The multi-user diversity can be classified into three kinds of diversities, i.e., a temporal multi-user diversity, a frequency multi-user diversity, and a spatial multi-user diversity.

The temporal multi-user diversity is adapted to allocate a channel to a specific user having the highest gain value when a channel situation changes with time.

The frequency multi-user diversity is adapted to allocate a sub-carrier to a specific user having the highest gain value in each frequency band in a frequency multi-carrier system such as an Orthogonal Frequency Division Multiplexing (OFDM) system.

If a channel situation slowly changes with time in another system which does not use the multi-carrier, the user having the highest channel gain value will monopolize the channel for a long period of time, and other users are unable to communicate with each other. In this case, in order to use the multi-user diversity, there is a need to induce the channel to change.

Next, the spatial multi-user diversity uses different channel gain values of users in space domain. An implementation example of the spatial multi-user diversity is a Random BeamForming (RBF) method (also called "Opportunistic Beamforming"). This RBF method performs beamforming with a predetermined weight using multiple antennas (i.e., multi-antenna) to induce the change of channel, and uses the above-mentioned spatial multi-user diversity.

In the meantime, the 3GPP LTE can use a maximum of 2 codewords. In this case, the 3GPP LTE requires two CQIs. In order to reduce an amount of transmission (Tx) CQI, a differential CQI or delta CQI concept has been developed. In more detail, a single CQI (i.e., a first CQI) is normally transmitted, and the other CQI (i.e., a second CQI) can transmit only a difference between the first CQI and the second CQI itself. The differential CQI or delta CQI concept uses a method similar to a differential modulation method for use in the modulation/demodulation scheme.

However, the 3GPP LTE has not prescribed a method for indicating which range will include a differential CQI value to perform the above-mentioned differential CQI reporting scheme. And, if the differential CQI value is quantized and transmitted, the 3GPP LTE has not prescribed a detailed quantization method of the differential CQI value.

Therefore, according to the second embodiment, the present invention provides the method for indicating which range will include the differential CQI value, and a method for transmitting channel information. Detailed descriptions of the above-mentioned methods will hereinafter be described.

In this case, the differential CQI is differential information between CQI values of two channels (i.e., two codewords), and is different from the sub-band differential CQI indicating differential information among CQI values of individual sub-bands according to the first embodiment. The differential information among CQI values of several channels or codewords will hereinafter be referred to as a "spatial differential CQI". If there is no confusion, it is assumed that differential information is spatial differential information and the differential CQI is a spatial differential CQI respectively hereinafter.

If the above-mentioned differential CQI value is quantized according to the second embodiment, a method for quantizing the differential CQI value, and indicating the quantized differential CQI value, and a method for additionally reducing an information amount of the differential CQI value when a signal is received via several unit frequency bands will hereinafter be described in detail.

When the MIMO system establishes the range of a differential CQI value, the present invention can determine the above-mentioned range in consideration of a probability distribution of the differential CQI value. It should be noted that the MIMO system may have different probability distributions of the differential CQI value according to reception (Rx) schemes of a receiver, so that the present invention provides a method for establishing the indication range of the differential CQI value. For this purpose, a signal receiving method using a receiver of the MIMO system will hereinafter be described.

Generally, the maximum likelihood (ML) scheme may be considered to be an optimum Rx method of the MIMO system. However, according to usages of the MIMO system, since a transmission (Tx) signal is spatially extended, the number of all cases for the ML scheme exponentially increases, so that the ML scheme actually applied to the system causes a serious problem in complexity.

Two quasi-optimum methods may be considered, i.e., a first method acting as a Minimum Mean Square Error (MMSE) scheme and a second method for applying the Successive Interference Cancellation (SIC) to the MMSE scheme. If the MMSE-based receiver instead of the ML-based receiver is used to detect space-time MIMO symbols, the MMSE-based receiver can acquire a higher advantage in complexity.

However, if only the MMSE scheme is used, a performance is less than that of the ML scheme. In order to reduce the performance deterioration, the above-mentioned second method for combining the MMSE and the SIC may be considered. Firstly, this combination method of the MMSE and the SIC removes detected signals according to the interference cancellation scheme, increases the SINR of the next detection signal, and implements a performance improvement.

For the convenience of description and better understanding of the present invention, the above-mentioned second method for applying the SIC to the MMSE will hereinafter be referred to as a "MMSE+SIC" scheme. If there is no confusion, the MMSE+SIC scheme may also be denoted by only the "SIC" scheme as necessary hereinafter.

The CQI probability distribution may be changed according to a difference of the signal receiving schemes of the receiver. In order to more quantitatively recognize the CQI difference, the following simulation is needed. In more detail, if the MIMO system including 4 Tx antennas and 4 Rx antennas transmits two codewords under a TU channel environment at a moving speed of 30 km/h, the comparison result between CQIs of codewords according to different Rx schemes is as follows. In this case, it is assumed that the CQI is quantized at intervals of 1 dB.

Basically, it is assumed that the SIC scheme detects a second codeword after detecting a first codeword.

In the meantime, in order to more correctly recognize the CQI difference between two Rx schemes, a CQI of a first codeword is deducted from the CQI of a second codeword, so that a difference $CQI_{Delta}$ between the two CQIs can be represented by the following equation 3:

$$CQI_{Delta} = CQI_{Codeword2} - CQI_{Codeword1}$$ [Equation 3]

Differently from Equation 3, some systems may represent the spatial differential CQI using a value acquired when the CQI value of the second codeword is subtracted from another CQI value of the first codeword. In this case, the above-mentioned target value $CQI_{Delta}$ has a code opposite to that of another value $CQI_{Delta}$, however, the target value $CQI_{Delta}$ can be applied to the following description in either the same manner as in the following description or another manner symmetrical to the following description.

Figure 4:
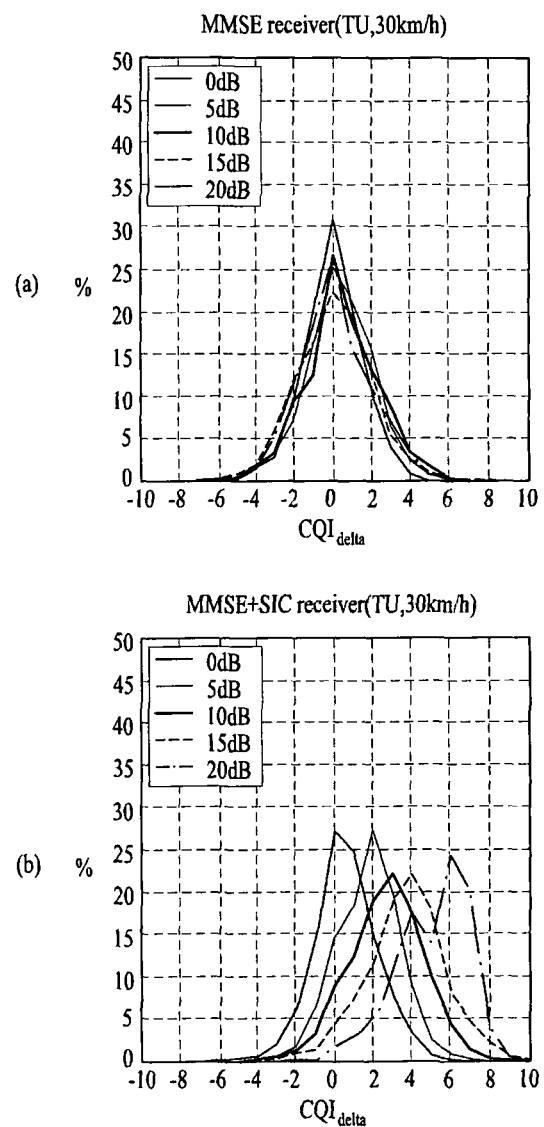
FIG. 4 is a graph illustrating a probability distribution difference of a differential CQI value according to a reception (Rx) method of a receiver.

FIG. 4 is a graph illustrating a probability distribution difference of a differential CQI value according to a reception (Rx) method of a receiver.

In more detail, FIG. 4(a) shows probability distribution values of the $CQI_{Delta}$ value under various SINR conditions when the MMSE-based receiver is used, and FIG. 4(b) shows probability distribution values of the $CQI_{Delta}$ value under various SINR conditions when the MMSE+SIC receiver is used.

As can be seen from the probability distribution of the $CQI_{Delta}$ value in FIG. 4, the following facts can be recognized. If the MMSE-based receiver is used, the CQI difference $CQI_{Delta}$ between two codewords is symmetrically distributed on the basis of "0". If the MMSE+SIC receiver is used, the difference $CQI_{Delta}$ between two codewords inclines to positive (+) values on the basis of "0".

The above-mentioned facts are theoretically reasonable. If the SIC-based receiver detects a second codeword, interference is removed from a first codeword, so that the probability of increasing the CQI of the second codeword is very high. In other words, according to the SIC scheme, the closer the detection process is to the end time, the higher the probability of improving the CQI. Therefore, the probability of assigning a value higher than "0" to the $CQI_{Delta}$ value is very high.

Generally, a first CQI for using in the spatial differential CQI scheme transmits all information for indicating a channel quality, and the next CQI from the first CQI can transmit only the $CQI_{Delta}$ value indicating a difference between the first CQI and the aforementioned next CQI itself. In order to reduce a Tx amount of the $CQI_{Delta}$ data, the spatial differential CQI scheme indicates the $CQI_{Delta}$ Tx data using a small number of bits less than those of an original CQI. Therefore, in order to effectively use the $CQI_{Delta}$ value using the same bits, the range denoted by the $CQI_{Delta}$ value must be properly established.

For example, as shown in FIG. 4(a), if an original value of a second CQI is transmitted without any change on the condition the $CQI_{Delta}$ value is not used, 21 steps (i.e., 21=10+1+10) corresponding to the interval [−10, 10] must be represented, so that 4.39 bits (i.e., $\log_2(21)$) are needed. Otherwise, as shown in FIG. 4(a), if the $CQI_{Delta}$ value is transmitted, only 13 steps (i.e., 13=6+1+6) corresponding to the interval [−6, 6] must be represented, so that 3.70 bit (i.e., $\log_2(13)$) are needed. As a result, if the $CQI_{Delta}$ value is used, the number of required Tx bits is reduced by about 0.69 bit.

For another example, as shown in FIG. 4(b), it is preferable that the $CQI_{Delta}$ range be set to an asymmetrical interval [−4, 10] on the basis of "0". In this case, 3.90 bits (=$\log_2(4+1+10)$) are consumed to select the above-mentioned asymmetrical interval.

As can be seen from the above-mentioned examples, the $CQI_{Delta}$ probability distribution is changed according to the Rx scheme, so that the range for indicating the $CQI_{Delta}$ value according to the $CQI_{Delta}$ probability distribution must be effectively selected, resulting in reduction of the number of required Tx bits.

The above-mentioned embodiment of the present invention is able to use the following scheme. If the $CQI_{Delta}$ distribution is symmetrical on the basis of "0" (e.g., if the MMSE-based receiver is used), it is preferable that the $CQI_{Delta}$ range be symmetrical on the basis of "0". Otherwise, if the $CQI_{Delta}$ distribution is asymmetrical on the basis of "0" (e.g., if the MMSE+SIC receiver is used), it is preferable that the $CQI_{Delta}$ range be asymmetrical on the basis of "0".

In the meantime, in fact, the CQI is always quantized so that the quantized CQI is then transmitted. Thus, the transmitters/receivers must pre-recognize the $CQI_{Delta}$ range. The $CQI_{Delta}$ range must be pre-engaged by the transmitters/receivers.

According to the above-mentioned embodiment, information indicating the Rx scheme of the receiver may be transmitted to the transmitter at a performance-information exchange step of each entity in an initial transmission beginning process executed between the transmitter and the receiver.

For example, if the receiver is the user equipment (UE), the user equipment (UE) may inform the Node-B of specific information indicating which one of Rx schemes is used at the UE performance reporting step contained in the communication beginning step. If the receiver is the Node-B, the Node-B may inform the user equipment (UE) of the Node-B receiving (Rx) scheme over a broadcast channel (BCH) and so on.

However, it should be noted that the above-mentioned embodiment is able to use all the arbitrary methods capable of transmitting the Rx-scheme information of the receiver to the transmitter, and a detailed method for transmitting the Rx-scheme information to the transmitter is not limited to the above-mentioned methods and can also be applied to other methods as necessary. Therefore, the range for indicating different $CQI_{Delta}$ values according to different Rx schemes of individual receivers may be differently selected by users.

In the meantime, according to another embodiment, the present invention provides a method for establishing the range of a channel-information differential value, irrespective of different Rx schemes of the receivers, so that the established differential-value range can be commonly used by all receivers. In this case, the probability distribution of the channel-information differential value is changed according to the Rx schemes, this embodiment establishes the differential-value range of channel information in consideration of all Rx schemes capable of being used by the receiver, and a detailed description thereof will hereinafter be described.

As described above, the $CQI_{Delta}$ range must be pre-recognized by the transmitters/receivers, so that the $CQI_{Delta}$ range must be pre-engaged by transmitters/receivers.

However, the $CQI_{Delta}$ range is basically determined by the Rx scheme of the receiver, and the MIMO system is able to use various receivers having differential Rx schemes. In this case, provided that different $CQI_{Delta}$ ranges are selected according to individual Rx schemes of the receivers, the complexity of the MIMO system may excessively increases.

Therefore, the above-mentioned embodiment uses the same $CQI_{Delta}$ range, irrespective of the $CQI_{Delta}$ distribution caused by a difference between Rx schemes of the receiver, so that the complexity of the MIMO system can be decreased.

More specifically, the above-mentioned embodiment provides a method for establishing the common $CQI_{Delta}$ range in consideration of all the $CQI_{Delta}$ distributions caused by the Rx-scheme difference of the receivers.

In the case of establishing the common $CQI_{Delta}$ range, the above-mentioned embodiment enables the $CQI_{Delta}$ distribution in a common range to be higher than a predetermined probability value in all Rx schemes capable of being used by the receiver. Therefore, the present invention can indicate the $CQI_{Delta}$ distributions, each of which has the predetermined probability value, according to the individual Rx schemes.

Although the $CQI_{Delta}$ distributions caused by various receivers are changed, the present invention can commonly use the $CQI_{Delta}$ range. In this case, the method for establishing the $CQI_{Delta}$ range will hereinafter be described in detail.

For example, as shown in FIG. 4, the $CQI_{Delta}$ range capable of being simultaneously applied to FIGS. 4(a) and 4(b) is [−6, 10]. In this case, 4.08 bits (=$\log_2(17)$) are consumed, so that a gain acquired by the used $CQI_{Delta}$ exists.

As can be seen from the above-mentioned example, although the same $CQI_{Delta}$ range is used irrespective of Rx schemes of individual receivers, the process for effectively selecting of the $CQI_{Delta}$ range in consideration of all distributions of the $CQI_{Delta}$ values depending on individual Rx schemes is very important to reduce the number of necessary Tx bits.

Therefore, this embodiment proposes the following scheme. If there are a variety of $CQI_{Delta}$ distributions, the $CQI_{Delta}$ range involving various $CQI_{Delta}$ distributions is selected. In a variety of $CQI_{Delta}$ probability distributions, if a first case, in which the $CQI_{Delta}$ probability distribution is symmetrical on the basis of "0", and a second case, in which the $CQI_{Delta}$ probability distribution is asymmetrical on the basis of "0", are detected from the above-mentioned $CQI_{Delta}$ probability distributions, the finally-selected $CQI_{Delta}$ range is determined to be asymmetrical on the basis of "0".

As described above, if the channel information is transmitted using the spatial differential channel information (e.g., spatial $CQI_{Delta}$), the above-mentioned second embodiment of the present invention determines the $CQI_{Delta}$ range in consideration of the $CQI_{Delta}$ probability distribution, so that it can more correctly indicate the channel information with less number of bits. In more detail, a first example of the second embodiment provides the method for establishing the $CQI_{Delta}$ range in consideration of differential Rx schemes of individual receivers, and a second example of the second embodiment provides the method for establishing the $CQI_{Delta}$ range in consideration of all Rx schemes capable of being used by the receivers.

The above-mentioned second embodiment has discussed the method for selecting the range indicating the spatial $CQI_{Delta}$ information. In this case, it is assumed that there is no error caused by the quantization interval (or level) of the spatial the $CQI_{Delta}$ information.

However, if the quantization interval of the $CQI_{Delta}$ information increases although the same $CQI_{Delta}$ range is used, it is difficult to correctly indicate a variation degree of channel information, whereas the number of Tx bits of the $CQI_{Delta}$ information is reduced. Otherwise, if the $CQI_{Delta}$ quantization interval is reduced, the variation degree of channel information can be more correctly indicated whereas the number of Tx bits of the $CQI_{Delta}$ information is increased.

Therefore, the following embodiment of the present invention provides a method for effectively establishing the quantization interval to effectively transmit $CQI_{Delta}$, and a detailed description thereof will hereinafter be described.

The simplest method for establishing the quantization interval may be considered to be a method for uniformly dividing the $CQI_{Delta}$ range. However, in the case of considering the $CQI_{Delta}$ probability distribution, the $CQI_{Delta}$ range can be more effectively quantized. In other words, $CQI_{Delta}$ frequently occurs in the high-probability part contained in the $CQI_{Delta}$ probability distribution, so that this $CQI_{Delta}$ value is more precisely quantized. $CQI_{Delta}$ occasionally occurs in the low-probability part contained in the $CQI_{Delta}$ probability distribution, so that it is preferable that this $CQI_{Delta}$ value be quantized to have a quantization interval wider than that of the high-probability part.

Figure 5:
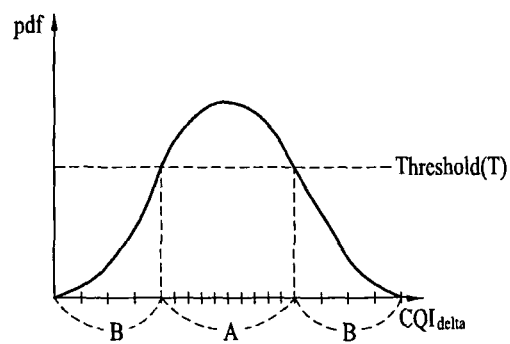
FIG. 5 is a graph illustrating a method for quantizing a differential channel information value according to an embodiment of the present invention.

FIG. 5 is a graph illustrating a method for quantizing a differential channel information value according to an embodiment of the present invention.

If the $CQI_{Delta}$ probability distribution appears as shown in FIG. 5, a narrow quantization interval is assigned to a specific area (A) having a probability distribution value higher than a predetermined threshold value (T), and a wide quantization interval is assigned to another area (B) having a probability distribution value higher than the predetermined threshold value (T). In FIG. 5, the threshold value (T) can be established in various ways in consideration of the number of bits required for indicating a corresponding CQI and the number of available bits for indicating the number of required bits. Also, although the graph area of FIG. 5 is divided into the area A having the narrow quantization interval and the other area B having the wide quantization interval, the quantization interval of the present invention is not limited to the above-mentioned example. If required, the quantization interval may also be established in different ways according to distinctive areas classified by two or three threshold values.

In the meantime, if the method for establishing the quantization interval according to the above-mentioned embodiment is applied to a specific case in which various $CQI_{Delta}$ probability distributions depending on Rx schemes of the receiver occur, the following operations are executed.

Figure 6:
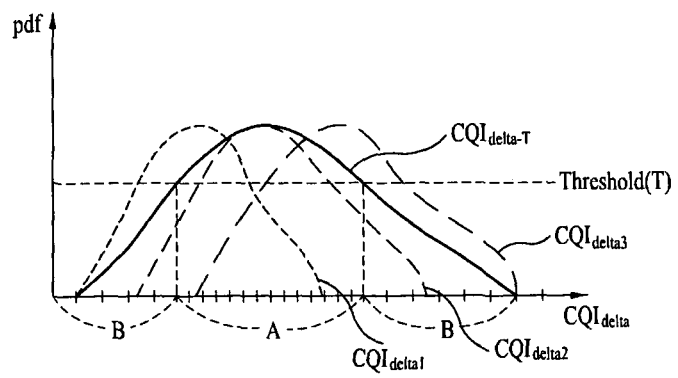
FIG. 6 is another graph illustrating a method for quantizing a differential channel information value according to an embodiment of the present invention.

FIG. 6 is another graph illustrating a method for quantizing a differential channel information value according to an embodiment of the present invention.

As can be seen from FIG. 6, the $CQI_{Delta}$ probability distribution appears in different ways according to Rx schemes of the receiver. For example, the $CQI_{Delta}$ probability distribution based on a first Rx scheme is denoted by "$CQI_{Delta}$ 1", the $CQI_{Delta}$ probability distribution based on a second Rx scheme is denoted by "$CQI_{Delta}$ 2", and the $CQI_{Delta}$ probability distribution based on a third Rx scheme is denoted by "$CQI_{Delta}$ 3", as shown in FIG. 6.

In this case, the above-mentioned embodiment considers all the different $CQI_{Delta}$ probability distributions depending on the Rx schemes of the receiver, so that it establishes the $CQI_{Delta}$ probability interval according to the considered result. In more detail, the present invention considers "$CQI_{Delta}$ T" in which a total of "$CQI_{Delta}$ 1", "$CQI_{Delta}$ 2", and "$CQI_{Delta}$ 3" have been considered, assigns a narrow quantization interval to the "A" area having a probability distribution value higher than the predetermined threshold value according to the consideration result of "$CQI_{Delta}$ T", and assigns a wide quantization interval to the "B" area having a probability distribution value less than the predetermined threshold value according to the consideration result of "$CQI_{Delta}$ T".

The above-mentioned description has disclosed the quantization method for indicating the differential channel information value "$CQI_{Delta}$". If the quantization interval is established as described above, the present invention can more correctly indicate channel information with less number of bits.

The above-mentioned CQI reporting scheme description has been related to the exemplary case for receiving the signal via a single unit frequency band. Provided that the receiver selects the unit frequency band having the best channel status and transmits only a CQI of the selected unit frequency band, and the transmitter performs a necessary service via the selected unit frequency band at the CQI, only one unit frequency band requires the CQI. The above-mentioned case is appropriate for a single-user environment, but is inappropriate for a multi-user environment, so that an effective method is needed.

For the convenience of description and better understanding of the present invention, it is assumed that the term "unit frequency band" is a single unit, in which arbitrary frequency bands having similar channel responses are bound, in a relatively-wide frequency band. It is assumed that the term "band" or "frequency band" is the above-mentioned unit frequency band on the condition that there are no comments about other situations.

In the meantime, the scheduling problem generated when the CQI is transmitted to only one preferable band will hereinafter be described.

If preferable frequency bands of multiple users (i.e., multi-user) are different from each other and their preferable frequency bands are not overlapped with each other, no problem occurs. In this case, the remaining users other than the selected user are not unable to use the corresponding frequency. If each user transmits only one preferable frequency band, unselected users basically lose the opportunity for receiving desired services. Therefore, in order to solve the above-mentioned problem, a CQI value of several frequency bands must be transmitted, so that a multi-user diversity gain can be effectively acquired.

If the CQI value corresponding to several frequency bands is transmitted, an amount of CQI Tx data increases by a predetermined amount corresponding to the selected frequency band. For example, if three better frequency bands are selected, and their CQIs and frequency-band indicators are transmitted to the selected frequency bands, the Tx amount of CQI increases three times, and additional information for the indicator of the selected frequency band must be transmitted.

As described above, if the CQI corresponding to several frequency bands is transmitted, the MIMO communication environment requires much more Tx information. If the CQI is transmitted in units of each antenna, the Tx information amount increases by times of the number of Tx antennas. In the meantime, if the CQI is transmitted in units of a codeword, the Tx information amount increases by times of the number of codewords. Therefore, the CQI Tx amount associated with several frequency bands excessively increases in the MIMO system than as compared to a single-antenna system.

Therefore, under the aforementioned situation in which the CQI associated with several frequency bands must be reported, this embodiment provides a method for effectively reducing the CQI Tx amount.

Generally, an entire frequency band of a frequency flat fading channel has the same channel environment, however, the frequency selective fading channel has different channel characteristics according to individual frequency bands. Typically, the frequency bandwidth having the same channel characteristics is called a coherent bandwidth. A multi-path channel having many channel paths has a shorter coherent bandwidth in inverse proportion to the number of channel paths.

Therefore, if some bands having a good channel status are selected and CQI values of the selected bands are transmitted, and the above bands exceed the coherent bandwidth, the similarity among corresponding CQI values is decreased. Therefore, the above-mentioned excessive reduction of the selected CQI information is undesirable.

However, if the MIMO system is used so that the CQI for each antenna or codeword must be transmitted to each selected band, another situation is provided. In other words, the CQI of each antennas or codeword is differently established according to individual frequency bands, but a difference of CQI values of any frequency band is almost similar to those of the other frequency bands. A detailed description thereof will hereinafter be described on the condition that two codewords are received in the MIMO system.

Figure 7:
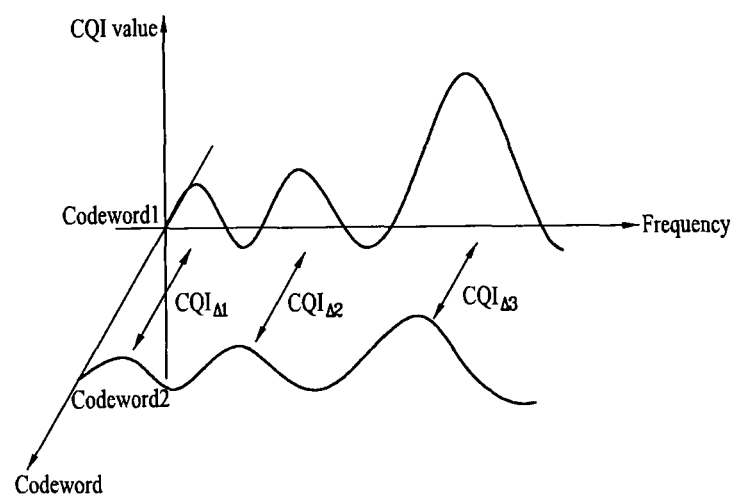
FIG. 7 exemplarily shows a channel-value distribution of each codeword when two codewords are received over several unit frequency bands.

FIG. 7 exemplarily shows a channel-value distribution of each codeword when two codewords are received over several unit frequency bands.

As shown in FIG. 7, if the receiver receives two codewords, a CQI of the first codeword and a CQI of the second codeword are greatly changed in each frequency band, but a difference between the two CQIs of the first and second codewords is not greatly changed although a current frequency band is changed to another frequency band. The CQI calculation of each codeword is affected by channels of other codewords, so that the CQI calculation processes of individual codewords are affected by interferences almost similar to each other.

In FIG. 7, a first codeword 1 and a second codeword 2 have different CQI values according to individual frequency bands, but differential CQI values (e.g., $CQI_{A1}$, $CQI_{A2}$, $CQI_{A3}$) of individual frequency bands have similar values.

Although the example of FIG. 7 has described the CQI values of individual codewords, it should be noted that the above-mentioned principle may also be applied to another case in which the CQI for each antenna is considered. Thus, the following embodiment of the present invention will exemplarily disclose a specific case in which the CQI for each codeword is used. However, it is obvious to those skilled in the art that the above-mentioned embodiment can also be applied to another case in which the CQI for each antenna is used as necessary.

In this way, if several codewords are applied to several antennas, a CQI difference differently occurs in individual frequency bands, and its detailed description will hereinafter be described with reference to the following simulation result.

Figure 8:
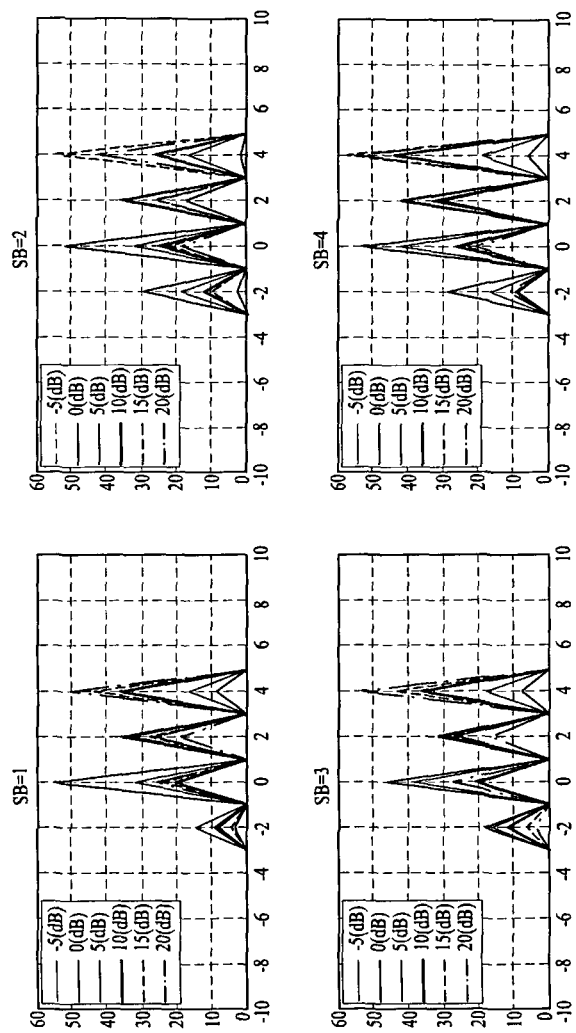
FIG. 8 is a simulation result illustrating a distribution of differential channel information in each unit frequency band when two codewords are transmitted.

FIG. 8 is a simulation result illustrating a distribution of differential channel information in each unit frequency band when two codewords are transmitted.

In more detail, if the MIMO system including 4 Tx antennas and 4 Rx antennas transmits two codewords under a TU channel environment at a moving speed of 3 km/h, the bandwidth of 5 MHz is divided into 4 frequency bands, and CQI differences between the codewords of individual frequency bands are shown in FIG. 8. In this case, the divided four frequency bands are denoted by "SB1", "SB2", "SB3", and "SB4", respectively. And, the differential CQI value is represented by the above Equation 3.

In the simulation of FIG. 8, the CQI is quantized at intervals of 1 dB. The SIC scheme is used as the Rx scheme. Basically, it is assumed that the SIC scheme detects a second codeword after detecting a first codeword.

As can be seen from FIG. 8, the differential CQI values of individual frequency bands are similar to each other, so that the individual frequency bands have differential-CQI distributions similar to each other. In other words, as shown in FIG. 8, the differential-CQI distributions in the frequency bands "SB1~SB4" are similar to each other. Generally, the differential-CQI distribution is not wide but narrow.

Based on the above-mentioned result, the present invention provides a method for reducing an amount of CQI Tx information, and a detailed description thereof will hereinafter be described.

Firstly, although a CQI of the first codeword is completely transmitted at each frequency band, a CQI of any codeword from the second codeword can be transmitted using only the differential CQI value, instead of transmission of an entire CQI. In this case, the range for indicating the differential CQI and the method for quantizing the differential CQI value can be established in different ways according to the above-mentioned embodiments. By the above-mentioned differential CQI transmission scheme, if another CQI from the second CQI is transmitted, an amount of Tx information can be reduced.

Secondly, in order to transmit the differential CQI of a codeword from the second codeword, the present invention may transmit only differential CQIs of some frequency bands, instead of transmitting all the differential CQIs of all the selected frequency bands. For example, the present invention may transmit only a differential CQI associated with a single frequency band. For another example, a maximum value, minimum value, and average value of the differential CQI may also be transmitted. For another example, it is preferable that the best channel be selected to maximize the Tx efficiency, so that another method for transmitting a differential CQI corresponding to a frequency band indicating the best channel environment may be considered.

In this way, if the differential CQI is transmitted to only some bands, the remaining frequency bands at which the differential CQI has not been transmitted may require a differential CQI of any codeword from the second codeword according to a scheduling situation. In this case, a specific differential CQI is selected from among the transmitted differential CQIs, and the selected differential CQI is used as a differential CQI of a corresponding frequency band without any change, or the weighted sum of the transmitted differential CQIs is calculated so that resultant value may be used as a differential CQI of a corresponding frequency band.

For example, if the only differential CQI of the best frequency band indicating the best channel environment is transmitted, the transmitted differential CQI may be applied to the remaining frequency bands other than the best channel without any change. For another example, if an average value (or a differential CQI of a specific band closest to the average value) of differential CQIs of several frequency bands is transmitted, the above-mentioned average value (or the differential CQI value closest to the average value) may also be applied to a frequency band at which the differential CQI has not been transmitted.

The effects of the CQI transmission methods according to the above-mentioned embodiments of the present invention will hereinafter be described with reference to the simulation of FIG. 9.

Figure 9:
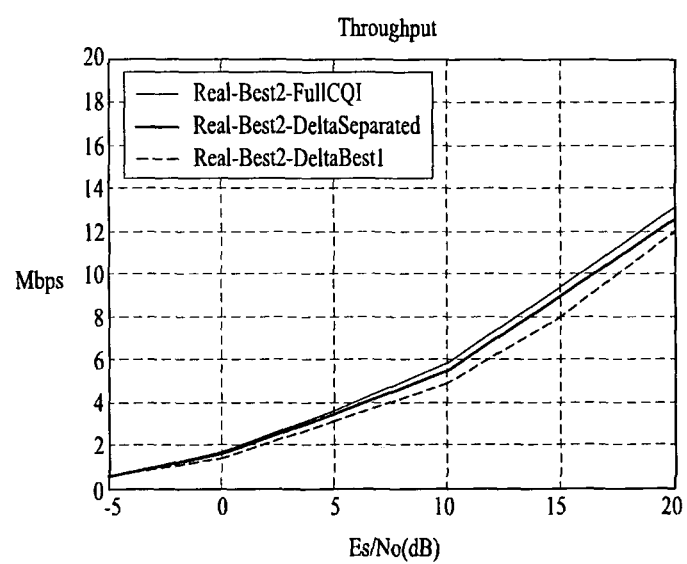
FIG. 9 is a simulation result illustrating a method for comparing a conventional channel information transmission method with an inventive channel information transmission method.

FIG. 9 is a simulation result illustrating a method for comparing a conventional channel information transmission method with an inventive channel information transmission method.

Basically, the simulation of FIG. 9 has the same environment as that of FIG. 8. Additional simulation conditions of FIG. 9 are as follows.

A bandwidth of 5 MHz is divided into 4 frequency bands, and two good frequency bands are selected from among the four frequency bands (i.e., Best-2 Scheme). In this case, a CQI of a first codeword at each of the two selected frequency bands is transmitted without any loss. However, a CQI of a second codeword can be transmitted in three ways.

Firstly, it is assumed that a first case is that the CQI of the second codeword has been completely transmitted at each of two frequency bands. The first case is denoted by "Full CQI" in FIG. 9.

Secondly, it is assumed that a second case is that a differential CQI is applied to the second codeword so that differential CQIs associated with two frequency bands are transmitted respectively. The second case is denoted by "Delta Separated" in FIG. 9. In this case, the differential CQI is quantized with 2 bits.

Thirdly, in the case of applying the differential CQI to the second codeword, it is assumed that a third case is that only the differential CQI of a highest-CQI-value band of the two frequency bands is transmitted. The third case is denoted by "Delta Best 1" in FIG. 9. In this case, the transmitted differential CQI is applied to the remaining frequency bands at which the differential CQI has not been transmitted, without any change.

The simulation results of transmission (Tx) efficiencies of the above-mentioned three cases are shown in FIG. 9. In FIG. 9, a horizontal axis is "Es/No" (i.e., Signal-to-Noise Ratio (SNR)), and a vertical axis is the transmission efficiency (i.e., a throughput).

In FIG. 9, if "Es/No" is 20 dB, the Full CQI case has a transmission efficiency of 13.08 Mbps, the Delta Separated case has a transmission efficiency of 12.54 Mbps, and the Delta Best 1 case has a transmission efficiency of 12.01 Mbps. Therefore, if the differential CQI is applied to each of second codewords, a throughput is deteriorated by 4.1% as compared to an optimum throughput. If only one differential CQI corresponding to the best channel from among second codewords is used, a throughput is deteriorated by 8.1% as compared to the optimum throughput. The above-mentioned throughput deterioration is caused by inaccuracy of CQI feedback information. A transmission amount of CQI information is greatly reduced, so that the above throughput deterioration may be considered to be allowable or endurable throughput deterioration.

The above-mentioned second embodiment of the present invention has disclosed the method for additionally reducing CQI information (i.e., Tx amount of spatial differential CQI information) when several codewords are received via several antennas and/or several unit frequency bands.

The first embodiment may be combined with the second embodiment as necessary.

For example, if the MIMO system transmits channel quality information of at least two channels, the MIMO system transmits an average value of channel quality information of a total frequency band in association with one of the two channels according to the second embodiment. And, the MIMO system configures channel quality information of the other channel in the form of differential information (i.e., spatial differential information), and transmit the differential-formatted channel quality information.

According to the first embodiment, the present invention may transmit channel quality information of each channel using an average value of total channel quality information and differential information (i.e., sub-band differential information) of channel quality information of sub-bands selected by the receiver.

In this case, the present invention transmits the spatial differential information according to the Rx scheme of the receiver, or configures the spatial differential information in the form of a specific value within a differential-value range irrelevant to the receiver's Rx scheme so that the configured result is transmitted. If the spatial differential information is established irrespective of the receiver's Rx scheme, it is preferable that the differential-value range be asymmetrical on the basis of "0".

The sub-band differential information inclines to the positive (+) area according to the first embodiment. It is preferable that the sub-band differential information be configured in the form of a specific value within the differential-value range composed of only the positive (+) area.

For example, although the above-mentioned embodiments of the present invention have been disclosed the CQI generation and transmission method on the basis of the 3GPP LTE standard, the inventive CQI generation method and the user equipment (UE) thereof are not limited to only the 3GPP LTE system, and can also be applied to other communication systems (e.g., IEEE 802-based communication systems) which may require a feedback of downlink channel quality information.

The above-mentioned embodiments of the present invention can be applied to both the downlink and the uplink. If the present invention is applied to the uplink, the transmitter may be the Node-B, and the receiver may be an user equipment (UE). The Node-B may be a fixed station communicating with the user equipment (UE), or may also be called a base station (BS), a Base Transceiver System (BTS), or an Access Point (AP). The user equipment (UE) may be fixed or have mobility. The user equipment (UE) may also be called a terminal, a User Terminal (UT), a Subscriber Station (SS) or a wireless device.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the channel information transmission method according to the present invention indicates channel information with less number of bits, and more correctly indicates the channel status. For example, the present invention can be applied to not only the 3GPP LTE system but also other communication systems which require a feedback of downlink channel quality information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for a user equipment (UE) to transmit a channel quality indicator (CQI) to a base station, the method comprising:
    selecting a preferred set of M subbands among a set of N subbands, wherein the set of N subbands spans an entire downlink system bandwidth;
    reporting the positions of the M selected subbands using a combinatorial index selected from among $\{0, 1, \ldots, {}_NC_M-1\}$;
    reporting one CQI value representing wideband CQI index for the set of N subbands; and
    reporting one differential CQI value reflecting the transmission of the base station only over the M selected subbands among a predetermined number of differential CQI values, wherein each of the differential CQI values is defined based on an offset level corresponding to:
    a CQI index for the M selected subbands—the wideband CQI index, and wherein the differential CQI values represent more of a first case in which the offset level has a positive value than a second case in which the offset level has a negative value.

2. The method of claim 1, wherein, when the UE selects the preferred set of M subbands, the UE reports the positions of subbands using the combinatorial index representing the M selected subbands.

3. The method of claim 1, wherein:
    each of the subbands comprises X frequency domain units,
    the entire downlink system bandwidth comprises Y frequency domain units, and
    the number of subbands spanning the entire downlink system bandwidth (N) corresponds to an integer number not less than Y/X.

4. The method of claim 1, wherein each of the subbands comprises a plurality of subcarriers.

5. The method of claim 1, wherein the differential CQI value is represented as a 2-bit value.

6. The method of claim 1, wherein the positions of the M selected subbands, the CQI value representing wideband CQI index and the differential CQI value are reported via a Physical Uplink Shared Channel (PUSCH).

7. A user equipment (UE) for transmitting a channel quality indicator (CQI) to a base station, the UE comprising:

a receiver configured to receive signals from the base station;

a processor configured to select a preferred set of M subbands among a set of N subbands, wherein the set of N subbands spans an entire downlink system bandwidth; and a transmitter configured to report the positions of the M selected subbands using a combinatorial index selected from among $\{0, 1, \ldots, {}_NC_M-1\}$, one CQI value representing wideband CQI index for the set of N subbands, and one differential CQI value reflecting the transmission of the base station only over the M selected subbands among a predetermined number of differential CQI values, wherein each of the differential CQI values is defined based on an offset level corresponding to:

a CQI index for the M selected subbands—the wideband CQI index, and wherein the differential CQI values represent more of a first case in which the offset level has a positive value than a second case in which the offset level has a negative value.

8. The UE of claim 7, wherein, when the processor selects the preferred set of M subbands, the transmitter reports the positions of subbands using the combinatorial index representing the M selected subbands.

9. The UE of claim 7, wherein:
each of the subbands comprises X frequency domain units,
the entire downlink system bandwidth comprises Y frequency domain units, and
the number of subbands spanning the entire downlink system bandwidth (N) corresponds to an integer number not less than Y/X.

10. The UE of claim 7, wherein each of the subbands comprises a plurality of subcarriers.

11. The UE of claim 7, wherein the differential CQI value is represented as a 2-bit value.

12. The method of claim 7, wherein the positions of the M selected subbands, the CQI value representing wideband CQI index and the differential CQI value are reported via a Physical Uplink Shared Channel (PUSCH).

\* \* \* \* \*